June 13, 1950 — E. M. PERRY — 2,511,002

FISH LURE

Filed Aug. 30, 1947

INVENTOR.
EDWIN M. PERRY
BY
Cook & Robinson
ATTORNEYS

Patented June 13, 1950

2,511,002

UNITED STATES PATENT OFFICE 2,511,002

FISH LURE

Edwin M. Perry, Issaquah, Wash.

Application August 30, 1947, Serial No. 771,513

2 Claims. (Cl. 43—42.5)

This invention relates to fish lures, and it has reference more particularly to lures for use in trolling, casting and similar operations such as commonly used in fishing for salmon, trout, bass and other kinds of fish that can be caught by means of lures and hooks drawn through the water.

It is the principal object of this invention to provide a novel form of fish lure for the purpose above stated that, when drawn through the water, will not spin nor roll but will have the true swimming action of a minnow.

It is also an object of my invention to provide a lure of the above kind that can be formed at relatively small cost from a single piece of sheet metal and which provides a plurality of flat angularly related surfaces from which light may be reflected and water deflected as the lure is drawn through the water, that will attract and deceive the fish, as an aid in catching it.

More specifically stated, the various objects and advantages of the present invention reside in the provision of a fish lure from a flat plate of sheet brass, or other suitable metal, having a longitudinal body portion, to the opposite ends of which the line and hooks are attached, and which body is formed with a plurality of angular bends, and is equipped along opposite, longitudinal edges with lateral turned flanges which give the body a fish-like appearance and action in use and operate to prevent any unnatural turning or rolling action.

Other objects reside in the details of construction and relationship of component parts as will hereinafter be fully described.

In accomplishing these and other objects of the invention, I have provided the improved details of construction, the preferred forms of which are illustrated in the accompanying drawings, wherein.

Figure 1:
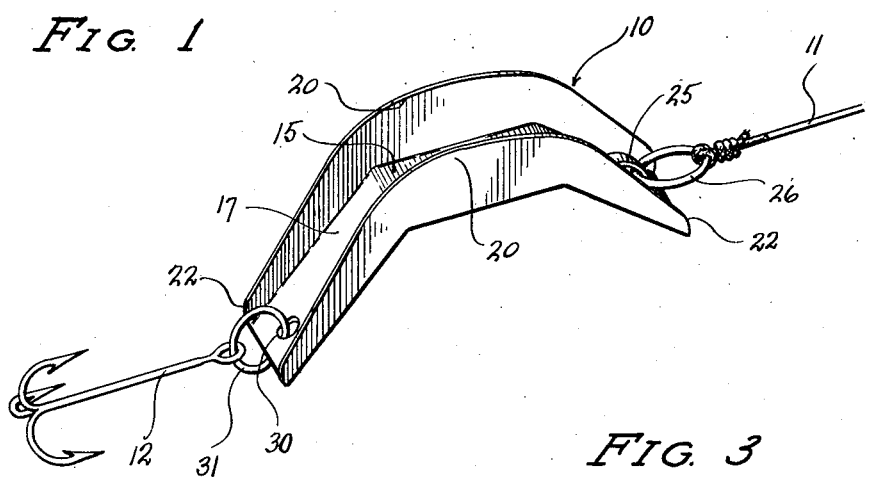
Fig. 1 is a perspective view, showing a fish lure embodied by the present invention.

Referring more in detail to the drawings:

10 designates the present lure in its entirety as seen in Fig. 1, and 11 designates a line, or leader, that is attached to the forward end of the lure, and 12 designates a fish hook that is attached to its rearward end. It is intended that lures of this kind shall be made in various sizes to meet various requirements, but it is to be explained that, regardless of size, the relationship of its various parts and their dimensional proportions can remain the same without detriment to use.

Figure 4:
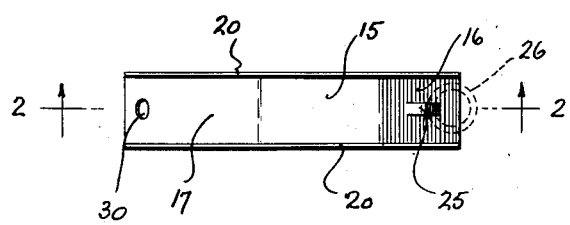
Fig. 4 is a top or plan view of the lure.
Figure 5:
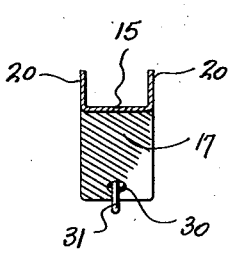
Fig. 5 is a cross section, taken on line 5—5 in Fig. 2.

In its present preferred form of construction, the lure 10 is formed from sheet metal, preferably of brass, but not limited thereto. Each lure comprises but a single blank or piece of the selected metal, bent to that shape most accurately shown in Figs. 2 and 4, wherein it is seen that the lure has a longitudinal body portion comprising a flat, medial portion 15 of a length that is approximately one-third the overall length of the lure and having a width equal to about one-half its length. Continuing forwardly from the flat medial portion 15, is a flat but angularly directed portion 16, which has a length that is equal approximately to one-fourth the overall length of the lure and is directed downwardly at an angle of about thirty-four degrees to the plane of part 15. At the rear end of the medial portion 15, is a continuing flat portion 17 having a length constituting about seven-twelfths of the overall length of the lure, and this part is directed downwardly from the plane of part 15, at an angle of approximately thirty-four degrees; the three flat portions 15, 16 and 17 are all of the same width, as seen in Fig. 4, and in straight alignment, and each merges into the other in a smoothly formed bend.

Figure 2:
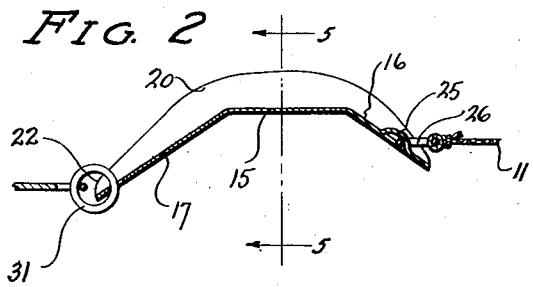
Fig. 2 is a central, longitudinal section of the same, as seen on line 2—2 in Fig. 4.
Figure 3:
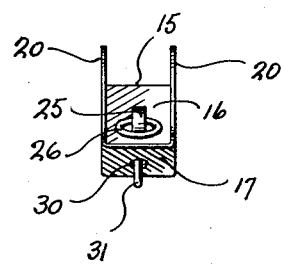
Fig. 3 is a front end view of the lure.

Formed longitudinally of the body portion of the lure, comprised by the parts 15, 16 and 17, and at opposite longitudinal edges thereof, are upwardly turned flanges 20—20. These lie in planes that are parallel to each other and perpendicular to the planes of the flat body forming portions. Each flange 20—20 is of the same size and shape of the other, and as shown in Figs. 1 and 2, the flanges are of greatest height along the opposite sides of body portion 15 and then gradually decrease in height toward the ends of the lure, and terminate in rounded ends, as at 22, that merge into the transverse end edges of the lure. Along the medial portion of the lure the flanges have a height that is equal to about one-half the width of the lure.

At its forward end, and extending in the central longitudinal line thereof, the lure body is formed with an upwardly struck strip portion 25, forming an eyelet beneath it through which a ring 26 is applied, and to which ring the line 11 is attached as shown in Fig. 1. The ring is slightly lesser in diameter than the spacing of the flanges 20—20 and does not interfere with the action of the lure when drawn through the water. In normal fishing operations the lure rides level in the water and substantially as seen in Fig. 2.

It has been determined that for best action, the eyelet 25 shall be located one-fourth inch back from the forward edge of the lure.

At the rear end of the lure, and in its central longitudinal line, the part 17 is formed with a hole 30 in which a ring 31 is applied and to which ring the hook 12 is attached as shown in Fig. 1.

The rings employed for the attachment of line and hook may be of any suitable kind and, for use in catching large fish, would preferably be soldered to prevent any possibility of the ring opening up under strain.

Lures of this kind have been found to be very effective for trolling operations in the catching of salmon and bass, and they can be made in sizes ranging from small to large to suit the requirements or desires of fishermen.

The angular relationship of the flat body surfaces 15, 16 and 17 provide water deflecting as well as light reflecting surfaces that successfully attract and deceive the fish, while the longitudinal flanges act as stabilizers or rudders that prevent spinning or rolling of the lure as drawn through the water. The various parts of the lure cause it to ride level in the water; to pull down in the water and have that true minnow swimming action that is much desired by fishermen.

Having thus described my invention, what I claim as new therein and desire to secure by Letters Patent is:

1. A fish lure comprising a rigid, elongated, body formed from a single piece of sheet material bent into an upwardly facing channel with a bottom wall and opposite side walls extending from end to end thereof in parallel planes of substantial spacing; said body comprising a medial portion of a length equal to about one-third the overall length of the lure, a forward end portion that is shorter than the medial portion and a rearward end portion that is longer than the medial portion; said forward and rearward end portions being directed angularly downward from the medial portion at angles of about 34 degrees with respect to the plane of the bottom of the medial portion, and said body being equipped near its forward and rearward ends, respectively, with means for the attachment of a line and a hook thereto.

2. A lure as recited in claim 1 wherein each of said portions of said body has a flat bottom, and the side walls of the channel have their top edges curved and gradually inclined toward and merging into the edges of the bottom of the channel at the ends of the lure.

EDWIN M. PERRY.

REFERENCES CITED

The following references are of record in the file of this patent:

UNITED STATES PATENTS

| Number | Name | Date |
|---|---|---|
| 1,421,991 | Rodgers et al. | July 4, 1922 |
| 1,585,943 | Streich | May 25, 1926 |
| 1,897,109 | Bobo | Feb. 14, 1933 |
| 2,088,775 | Davenport | Aug. 3, 1937 |
| 2,251,593 | Mangle | Aug. 5, 1941 |